US010082259B1

(12) United States Patent
Pahl

(10) Patent No.: US 10,082,259 B1
(45) Date of Patent: Sep. 25, 2018

(54) APERTURE TRIM ASSEMBLY FOR RECESSED LIGHTING FIXTURE

(71) Applicant: Focal Point, LLC, Chicago, IL (US)

(72) Inventor: Scott Pahl, Lisle, IL (US)

(73) Assignee: Focal Point, LLC, Chicago, IL (US)

( * ) Notice: Subject to any disclaimer, the term of this patent is extended or adjusted under 35 U.S.C. 154(b) by 0 days.

(21) Appl. No.: 15/603,625

(22) Filed: May 24, 2017

(51) Int. Cl.

| | |
|---|---|
| ***G02F 1/1347*** | (2006.01) |
| ***F21S 8/02*** | (2006.01) |
| ***F21V 33/00*** | (2006.01) |
| ***F21V 17/16*** | (2006.01) |
| ***F21V 5/04*** | (2006.01) |

(52) U.S. Cl.
CPC .................. *F21S 8/02* (2013.01); *F21V 5/04* (2013.01); *F21V 17/166* (2013.01); *F21V 33/006* (2013.01)

(58) Field of Classification Search
CPC .. F21S 8/02; F21V 5/04; F21V 33/006; F21V 17/166
See application file for complete search history.

(56) References Cited

U.S. PATENT DOCUMENTS

| | | | | |
|---|---|---|---|---|
| 8,297,804 | B2 * | 10/2012 | Buse | F21V 21/04 362/147 |
| 9,243,786 | B1 * | 1/2016 | Onda | F21V 21/14 |
| 2017/0314749 | A1 * | 11/2017 | Czech | F21S 8/026 |
| 2017/0314760 | A1 * | 11/2017 | Vice, Jr. | F21V 3/00 |
| 2017/0314770 | A1 * | 11/2017 | Pahl | F21V 21/16 |

* cited by examiner

*Primary Examiner* — Tracie Y Green
(74) *Attorney, Agent, or Firm* — Banner & Witcoff, Ltd.

(57) ABSTRACT

An aperture trim assembly for a recessed lighting fixture with an aperture trim that connects to a rotatable ring where the rotatable ring has a pair of tension springs attached. The tension springs connect the aperture trim assembly to a recessed lighting fixture, where the light may be rotated while the aperture trim remains fixed. The rotatable ring can rotate relative to the aperture trim allowing the aperture trim to remain fixed. A retention plate may further secure both a lens and the rotatable ring to the aperture trim.

20 Claims, 11 Drawing Sheets

APERTURE TRIM ASSEMBLY FOR RECESSED LIGHTING FIXTURE

TECHNICAL FIELD

This disclosure relates to a rotating engagement system for an aperture trim assembly that engages a recessed lighting fixture.

BACKGROUND

Recessed lighting fixtures include tension springs that are fixed in position with a support structure. Recessed lighting fixtures may also include a trim assembly that must be aligned to an adjustable assembly that may rotate to provide an angular focus of a light source of the recessed lighting fixture. However, tension springs fixed in position on a recessed lighting trim do not accommodate alignment of the trim assembly and the housing when supporting features on the housing are rotated. A means to accommodate the alignment of the trim assembly and the housing when the supporting features on the adjustable assembly are rotated would be beneficial.

SUMMARY

The following presents a general summary of aspects of the invention in order to provide a basic understanding of the invention and various features of it. This summary is not intended to limit the scope of the invention in any way, but it simply provides a general overview and context for the more detailed description that follows.

Aspects of this disclosure may relate to an aperture trim assembly for a recessed lighting fixture. The aperture trim assembly may comprise an aperture trim, a ring, and a retention plate securing the ring on the aperture trim. The aperture trim may include a top surface defined along a perimeter of an aperture trim opening extending through the aperture trim. The aperture trim may further comprise one or more receiving members, wherein each receiving member is configured to receive a securing member. The ring may comprise a circular exterior shape with a circular interior opening. The ring may further comprise a first pair of elongated slots and a second pair of elongated slots that are configured to receive a first tension spring and a second tension spring. The retention plate may have a central opening that extending through the retention plate, and a plurality of elongated openings extending through the retention plate. The ring may freely rotate around a center of the aperture trim opening, and further wherein the retention plate may be secured to the aperture trim using a plurality of securing members.

Still other aspects of this disclosure may relate to an adjustable trim assembly for a recessed lighting fixture that includes an aperture trim, a ring, and a retention plate securing the ring on the aperture trim. The aperture trim may comprise a flange surface and a plurality of support walls that extend from the flange surface toward a top surface defined along a perimeter of an aperture trim opening extending through the aperture trim. Each of the plurality of support walls may comprise a receiving member having a ring supporting surface that is substantially parallel to the flange surface of the aperture trim and wherein each receiving member is configured to receive a securing member. The ring may comprise a circular exterior shape and a circular interior opening defining an interior surface. The ring may include a first pair of elongated slots and a second pair of elongated slots, wherein the first pair of elongated slots are positioned on an opposite side of a centerline such that the second pair of elongated slots are mirrored from the first pair of elongated slots. The first pair of elongated slots and the second pair of elongated slots may be configured to receive a first tension spring and a second tension spring. The retention plate may include a plurality of elongated openings extending through the retention plate, wherein the retention plate is secured to the aperture trim using a plurality of securing members. Each receiving member may further comprise an alignment boss extending generally perpendicular to the flange surface, wherein each alignment boss engages one of the elongated openings of the retention plate and a ring supporting surface. The ring may freely rotate around a center of the aperture trim opening. At least one of the ring supporting surfaces may contact the ring when the ring rotates between the aperture trim and the retention plate.

Other aspects of this disclosure may relate to a recessed light fixture comprising an adjustable trim assembly connecting to a plaster frame of the recessed light fixture including a first tension spring and a second tension spring that engages an adjustable assembly of the recessed light fixture and a light source engaged with the adjustable assembly. The adjustable trim assembly may further include an aperture trim, a ring, and a retention plate securing the ring on the aperture trim. The aperture trim may include a top surface defined along a perimeter of an aperture trim opening extending through the aperture trim. The aperture trim may further comprise one or more receiving members, wherein each receiving member is configured to receive a securing member. The ring may comprise a circular exterior shape with a circular interior opening. The ring may further comprise a first pair of elongated slots and a second pair of elongated slots that are configured to receive a first tension spring and a second tension spring. The retention plate may have a central opening that extending through the retention plate, and a plurality of elongated openings extending through the retention plate. The ring may freely rotate around a center of the aperture trim opening, and further wherein the retention plate may be secured to the aperture trim using a plurality of securing members.

BRIEF DESCRIPTION OF THE DRAWINGS

The present invention is illustrated by way of example and not limited in the accompanying figures in which like reference numerals indicate similar elements and in which.

Further, it is to be understood that the drawings may represent the scale of different components of one single embodiment; however, the disclosed embodiments are not limited to that particular scale.

DETAILED DESCRIPTION

In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "front," "back," "side," "rear," and the like may be used in this specification to describe various example features and elements of the invention, these terms are used herein as a matter of convenience, e.g., based on the example orientations shown in the figures or the orientation during typical use. Nothing in this specification should be construed as requiring a specific three dimensional orientation of structures in order to fall within the scope of this invention.

The following terms are used in this specification, and unless otherwise noted or clear from the context, these terms have the meanings provided below.

"Generally parallel" means that a first line, segment, plane, edge, surface, etc. is approximately (in this instance, within 5%) equidistant from with another line, plane, edge, surface, etc., over at least 50% of the length of the first line, segment, plane, edge, surface, etc.

"Generally perpendicular" means that a first line, segment, plane, edge, surface, etc. is approximately (in this instance, within 5%) oriented approximately 90 degrees from another line, plane, edge, surface, etc., over at least 50% of the length of the first line, segment, plane, edge, surface, etc.

"Plurality" indicates any number greater than one, either disjunctively or conjunctively, as necessary, up to an infinite number.

Figure 2A:
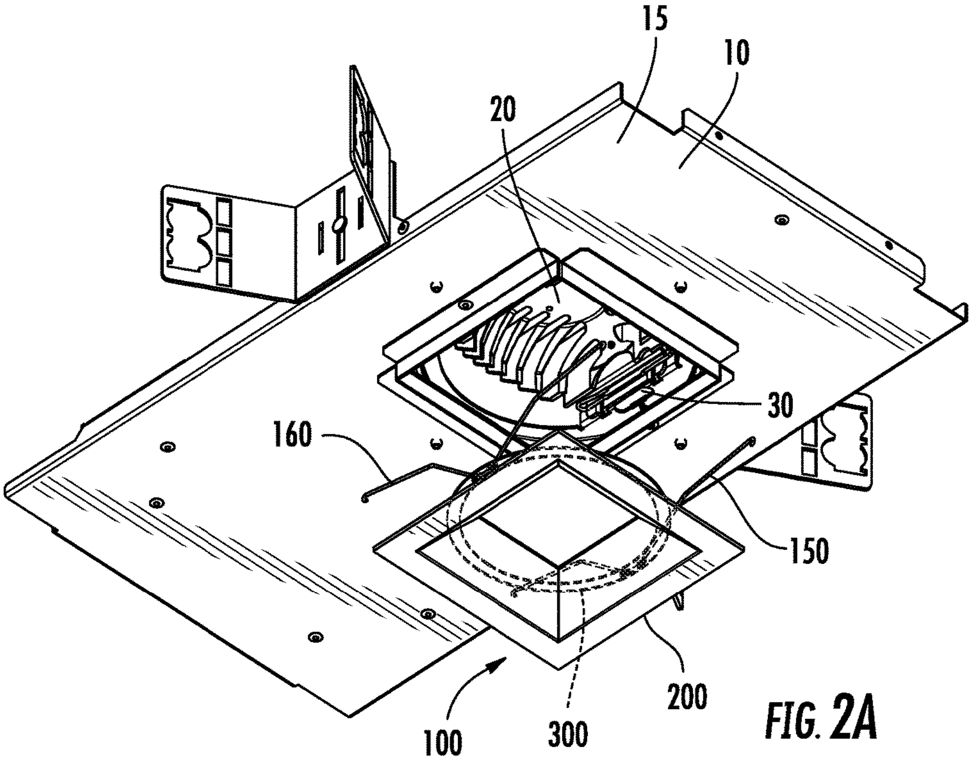
FIG. 2A illustrates an exploded view of a recessed lighting fixture assembly featuring an adjustable trim assembly according to one or more aspects described herein.
Figure 2B:
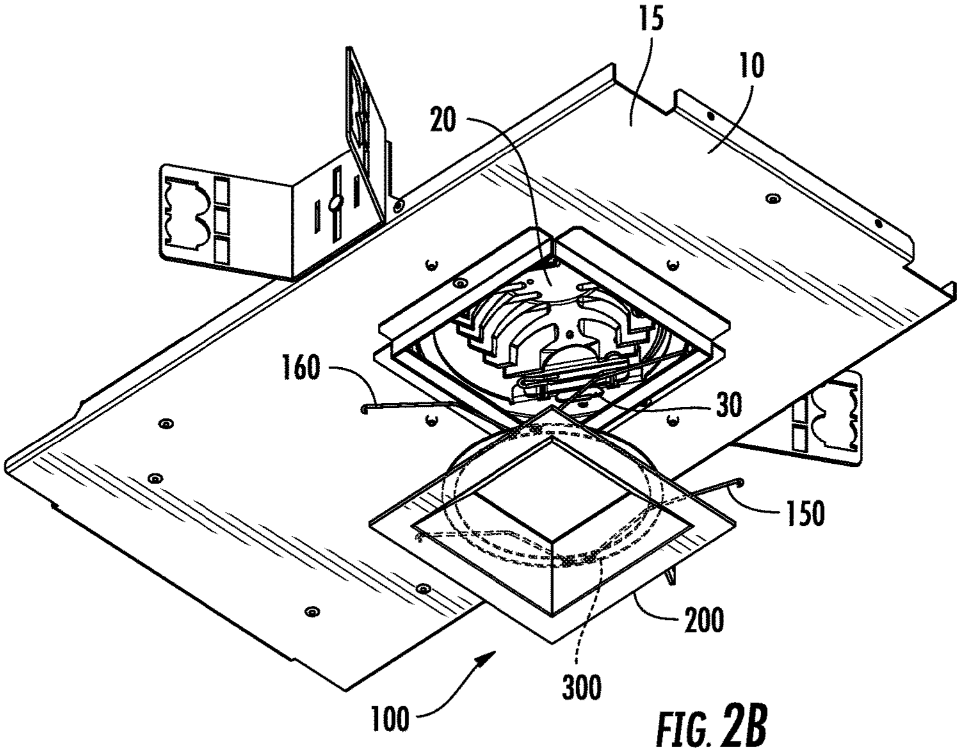
FIG. 2B illustrates an exploded view of a recessed lighting fixture assembly featuring an adjustable trim assembly according to one or more aspects described herein.

Generally, as illustrated in FIGS. 2A and 2B, this disclosure relates to a recessed downlight adjustable trim assembly 100 that includes an aperture trim 200 with two tension springs 150, 160 and a rotatable ring 300. The rotatable ring 300 may rotate between the aperture trim 200 and a retention plate 400 that covers the aperture trim 200 to enable the rotation or adjustment of the direction of a light source without the aperture trim 200 moving, thus keeping the aperture trim 200 and light fixture housing aligned. The rotatable ring 300 rotates allowing the light source to rotate as the aperture trim 200 stays fixed.

FIG. 2A illustrates an exploded view of the adjustable assembly 100 connecting to the plaster frame 15 of a recessed light fixture 10. The tension spring 150 engages and extends into an opening 30 of an adjustable assembly 20. The adjustable assembly may include a heatsink or heatsink assembly, which holds a light source (not shown). The tension spring 160 engages and extends into an opening on an opposite side (not shown). FIG. 2B illustrates the same exploded view of the adjustable assembly 100 connecting to the plaster frame 15 of a recessed light fixture 10 as shown in FIG. 2A. As shown in FIG. 2B, the adjustable assembly 20 with the light source may be tilted relative to its location shown in FIG. 2A. The adjustable assembly 20 may be tilted to adjust the direction of the light source. However, while the adjustable assembly 20 is tilted in FIG. 2B, the adjustable assembly 20 may also be rotated. When the adjustable assembly 20 is rotated, the rotatable ring 300 along with the tension springs 150, 160 rotate to correspond with the rotation of the adjustable assembly 20 and relative to the aperture trim 200 such that the aperture trim 200 remains in the same position. Thus, the adjustable trim assembly 100 allows for the rotation and adjustment of a light source, while the aperture trim 200 remains fixed to and aligned with the light fixture housing.

Figure 1:
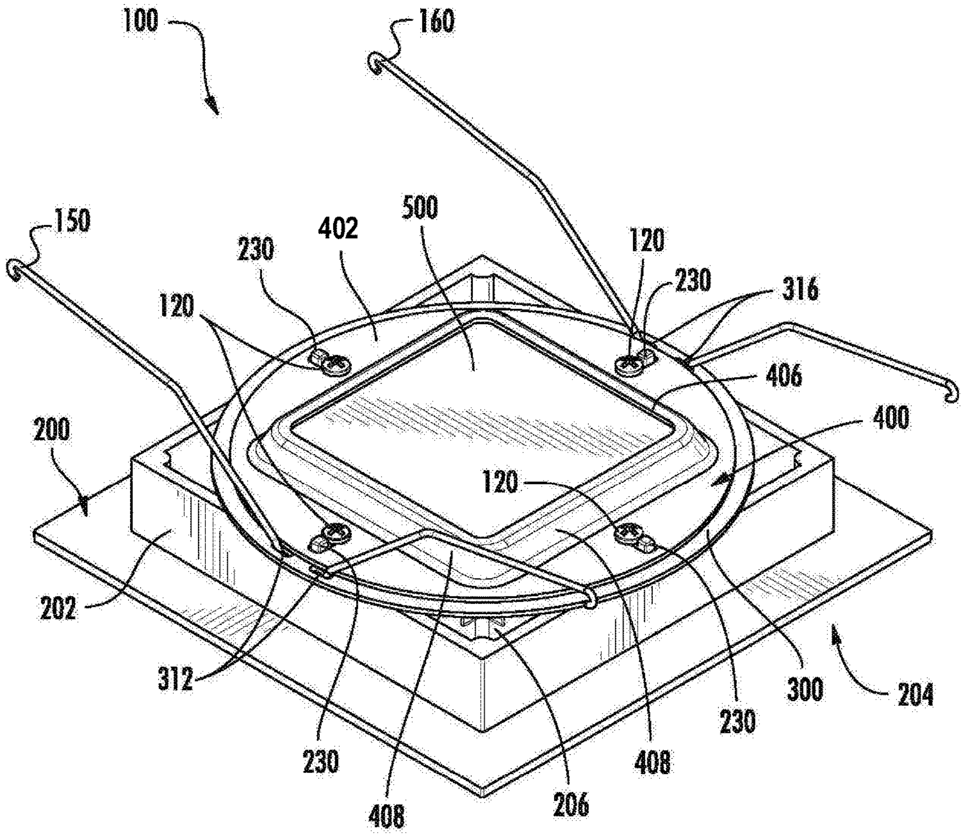
FIG. 1 illustrates a top front perspective view of an example embodiment of an adjustable trim assembly according to one or more aspects described herein.
Figure 3:
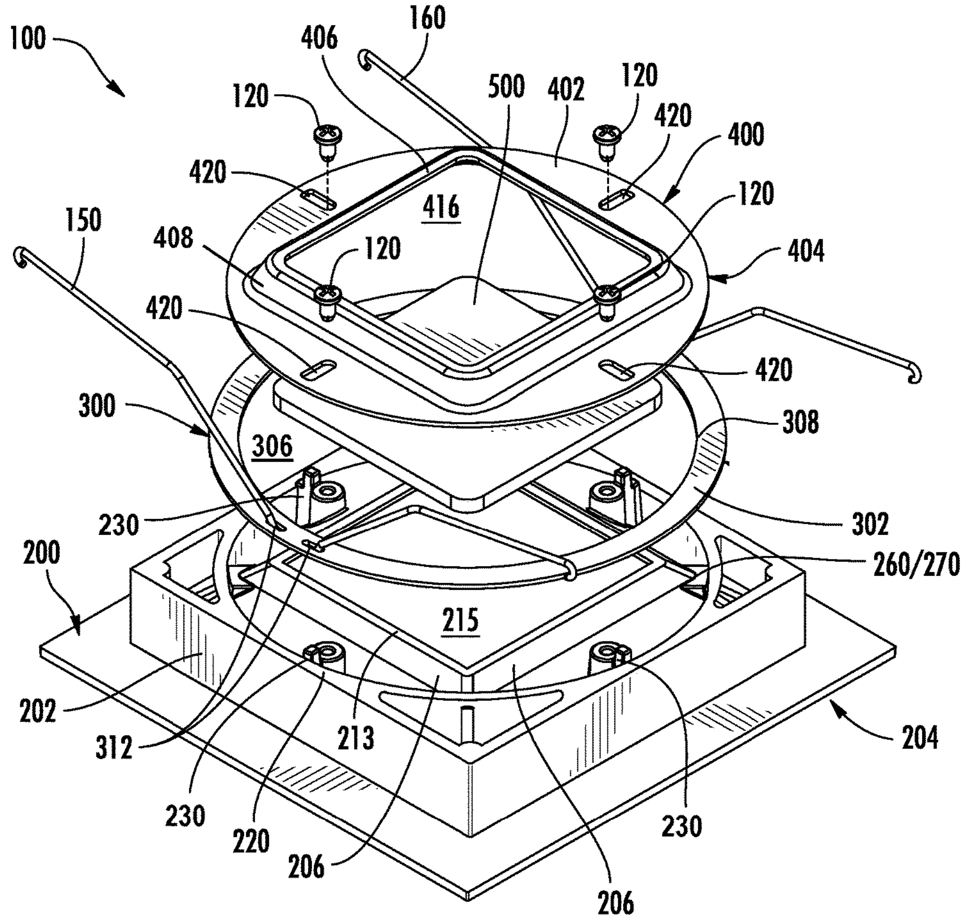
FIG. 3 illustrates an exploded view of the example embodiment of the adjustable trim assembly of FIG. 1.

FIGS. 1 and 3 illustrate a perspective view and an exploded view of an exemplary embodiment of the adjustable trim assembly 100. The adjustable trim assembly 100 may include an aperture trim 200 comprising a flange surface 204. The aperture trim 200 may include an aperture trim opening 215 extending through a center of the aperture trim 200. The aperture trim opening 215 may be generally square shaped. Alternatively, the aperture trim opening 215 may be generally circularly shaped, rectangularly shaped, or have any shape.

The aperture trim 200 may have a generally square exterior shape or may have a circular shape or any shape that may include a plurality of side walls 202 and a plurality of support walls 206. The side walls 202 and support walls 206 may extend in different directions from the flange surface 204. For example, the side walls 202 may extend substantially perpendicular to the flange surface 204, while the support walls 206 may extend at an acute angle to the flange surface 204 toward a top surface 213 that is defined along a perimeter of the aperture trim opening 215. The support walls 206 may also extend at an acute angle to the side walls 202. The side walls 202 may extend a portion of the distance from the flange to the top surface 213.

Both the plurality of side walls 202 and plurality of support walls 206 may be planer surfaces or alternatively may have some curvature. Further, the support walls 206 may be angled relative to the flange surface 204 to form a generally truncated pyramidal shape with the top surface 213. While exemplary embodiments show four support walls 206, the number of support walls 206 could be any number of support walls such as one support wall if circular, or three support walls, or five support walls.

Figure 4:
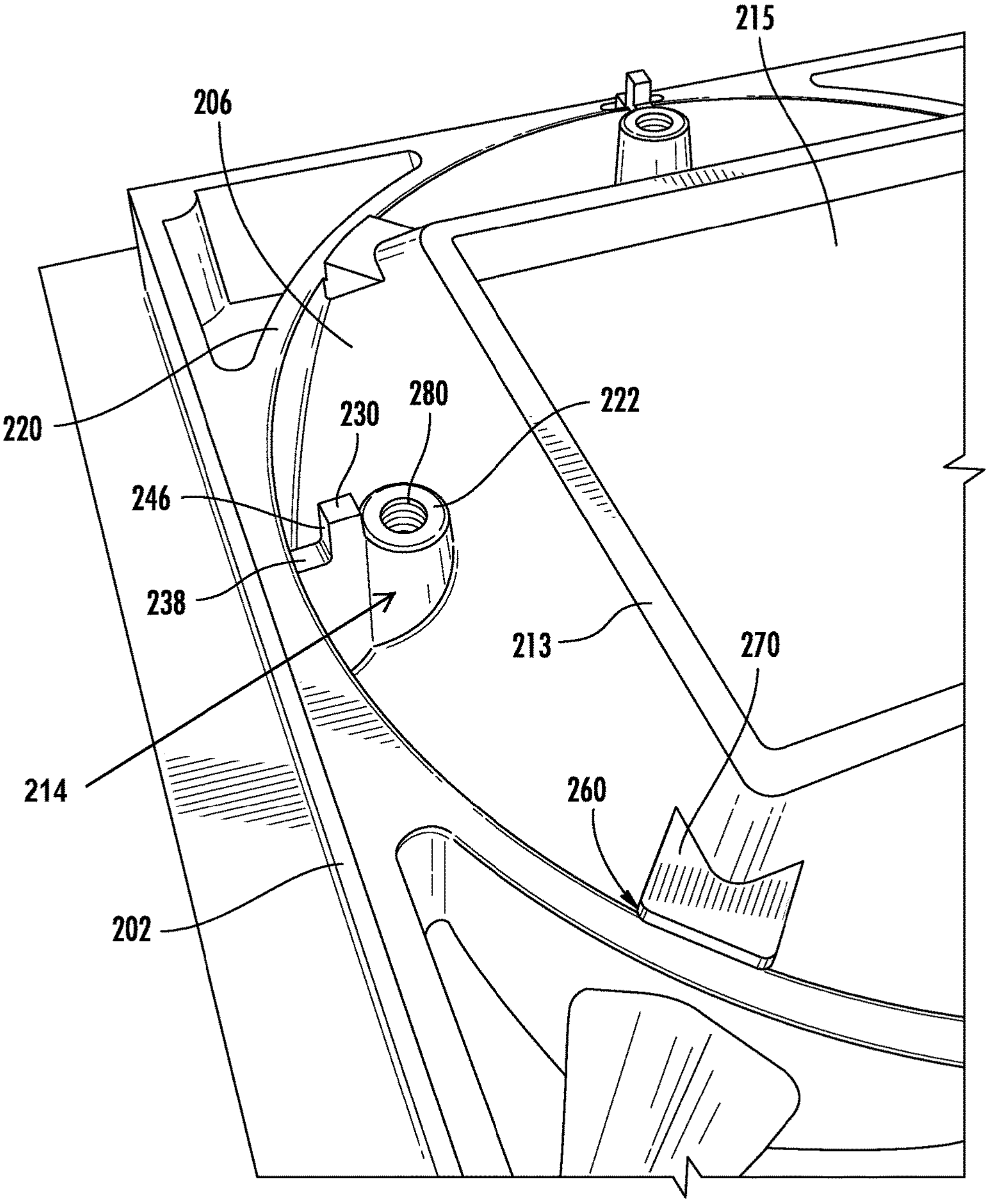
FIG. 4 illustrates a magnified view of the aperture trim of the example embodiment of the adjustable trim assembly of FIG. 3.

As illustrated specifically in FIG. 4, each support wall 206 may comprise a respective receiving member 214. The receiving members 214 may connect to each support wall 206 to its corresponding side wall 202. The receiving members 214 may be positioned on the support walls 206 and extend in a direction generally perpendicular to the flange surface 204. Each receiving member 214 may be evenly spaced around the center of the aperture trim opening 215. For example, as shown in the exemplary embodiments of FIGS. 1-8, there are four receiving members 214 that are evenly spaced apart and oriented approximately 90 degrees apart from each other when using the center of the aperture trim opening 215 as a reference. Alternatively, each receiving member 214 may be irregularly spaced around the center of the aperture trim opening 215. Additionally, in the exemplary embodiments shown, each support wall 206 has a single receiving member 214 that is located at approximately the center of its respective support wall 206. Alternatively, while the exemplary embodiments comprise four receiving members 214, the plurality of receiving members may comprise any number of receiving members such as two receiving members, or three receiving members, or even more receiving members. As specifically illustrated in FIG. 4, each receiving member 214 may have a receiving surface 222 with a hole 280 shaped to receive a securing member 120. The holes 280 may be threaded holes if the securing member 120 is a mechanical fastener or screw. The receiving surfaces 222 may be coplanar to each other and parallel to the flange surface 204.

In addition, each receiving member 214 may further have an alignment boss 230 extending from their respective receiving surfaces 222 in a generally perpendicular direction. Each alignment boss 230 may have a width generally equal to the diameter of the securing member 120. Also, each alignment boss 230 may have a height sufficient to extend through the rotatable ring 300 and the top surface 402 of the retention plate 400. As another option, each receiving member 214 may also have a respective ring supporting surface 238 that forms a surface adjacent of its respective alignment boss 230 and offset a distance toward the flange surface 204. The ring supporting surface 238 may be generally parallel to the receiving surface 222 of its respective receiving member 214. Each alignment boss 230 may be positioned between and thus separate its respective top surface 222 and its respective ring supporting surface 238.

Each alignment boss 230 may also have respective ring guide surface 246 formed on an exterior or outboard surface of each alignment boss. These ring guide surfaces 246 may be curved surfaces or alternatively, they may be planar. Furthermore, the center of the holes 280 and alignment bosses 230 may be located on concentric circles with a center point at the center of the aperture trim opening 215. Each alignment boss 230 may be formed as a separate part and installed onto the aperture trim 200, such as a pin or may be formed integrally with the aperture trim 200. Alternatively, each alignment boss 230 may be located independent from the receiving members 214 and ring supporting surfaces 238.

Each ring supporting surface 238 may be located outboard of its respective alignment boss 230. Alternatively, each ring supporting surface 238 may be located independent from the receiving members 214 and alignment bosses 230. The ring supporting surfaces 238 may be coplanar and offset a distance towards the flange surface 204 that is equal to or greater than the thickness of the rotatable ring 300 from their respective top surfaces 222 of their receiving members 214.

In addition, the aperture trim 200 may include a spring supporting surface 220. The spring supporting surface 220 may have a circular shape and may also be coplanar with a top surface 203 of the plurality of side walls 202 and also parallel to the flange surface 204. The spring supporting surface 220 may be offset a vertical distance from the ring supporting surface 238. The outside diameter of the spring supporting surface 220 may be less than the outside diameter of the rotation ring 300. The spring supporting surface 220 may support the tension springs 150, 160 as they are rotated along with the rotation ring 300 around the aperture trim opening 215 to ensure the tension springs 150, 160 do not move vertically while the rotation ring 300 is rotated.

The aperture trim 200 may further comprise a plurality of support bosses 260 that each have an engaging surface 270 that are parallel to the flange surface 204 and may be coplanar to each other. The engaging surfaces 270 may also be coplanar with the ring supporting surfaces 238. Alternatively, the engaging surfaces 270 may be offset a distance from the ring supporting surfaces 238. The support bosses 260 may be equally spaced apart from each other and also spaced equally apart from the receiving members 214. For example, in the exemplary embodiments of FIGS. 1-8, each of the support bosses 260 are positioned approximately 90 degrees apart from each other and also approximately 45 degrees apart from each receiving member 214. This spacing helps to ensure the rotatable ring 300 has sufficient support in multiple locations. While the exemplary embodiments comprise four support bosses 260, the plurality of receiving members may comprise any number of support bosses 260 such as two support bosses, or three support bosses, or more.

The rotatable ring 300 may be located onto the aperture trim 200 by the receiving members 214. The rotatable ring 300 may have a ring surface 302. The exterior shape of the rotatable ring 300 is preferably circular, while it could have a different exterior shape.

The rotatable ring 300 may have a circular interior opening 306 defining an interior surface 308. In particular, the ring surface 302 of the rotatable ring 300 may engage the ring supporting surfaces 238 of their respective receiving members 214. Additionally or alternatively, the ring surface 302 may also communicate or contact with the engaging surfaces 270 of their respective support bosses 260.

The interior surface 308 of the rotatable ring 300 may also be in communication with at least one of the ring guide surfaces 246 of the alignment boss 230. These ring guide surfaces 246 may help to align the interior opening 306 of the rotatable ring 300 with the aperture trim opening 215. While the interior surface 308 may be in communication with at least one of the ring guide surfaces 246, the rotatable ring 300 is still free to rotate around the aperture trim 200 and along the ring supporting surfaces 238.

The rotatable ring 300 may further include a first pair of elongated slots 312 and a second pair of elongated slots 316. The first pair of elongated slots 312 may be positioned on a first side of the rotatable ring 300 such that the second pair of elongated slots 316 are mirrored from the first pair of elongated slots 312 and positioned on an opposite side. The pairs of elongated slots 312, 316 may be curved or linear. Additionally, the pairs of elongated slots 312, 316 may have a width slightly wider than the width of the wire forming the tension springs 150, 160. Further, a first elongated slot of each pair may be spaced a fixed distance from its corresponding second elongated slot. For example, the space between the first elongated slot and the second elongated slot may be at least 2 times the length of each of the elongated slots.

As also shown in FIGS. 1 and 3, the adjustable trim assembly 100 may include a first tension spring 150 and a second tension spring 160. The first tension spring 150 may have a substantially V-shaped portion that extends through the first pair of elongated slots 312 of the rotatable ring 300. Similarly, the second tension spring 160 may also have a substantially V-shaped portion that extends through the second pair of elongated slots 316 of the rotatable ring 300. As the tension springs 150, 160 are secured to the rotatable ring 300, the tension springs 150, 160 move with the rotatable ring 300 with respect to the aperture trim 200.

The tension springs 150, 160 may generally have a V-shape that engages and secures the adjustable trim assembly 100 to the adjustable assembly 20. The ends of the tension springs 150, 160 may include a retaining feature that may be in the shape of a hook that retains the adjustable trim assembly 100 to the plaster frame 15 of a recessed light fixture 10. The tension springs 150, 160 may be formed from a single, uniform wire generally of a metallic material such as a steel, steel alloy, or alternatively from an aluminum or aluminum alloy.

As illustrated in FIGS. 1 and 3, a retention plate 400 may be installed over the rotatable ring 300 and secured to the aperture trim 200. The rotatable ring 300 may be positioned between the retention plate 400 and the aperture trim 200. A portion of the retention plate 400 may extend over a portion of the rotatable ring 300 to help secure the rotatable ring 300 to the aperture trim 200.

Figure 5:
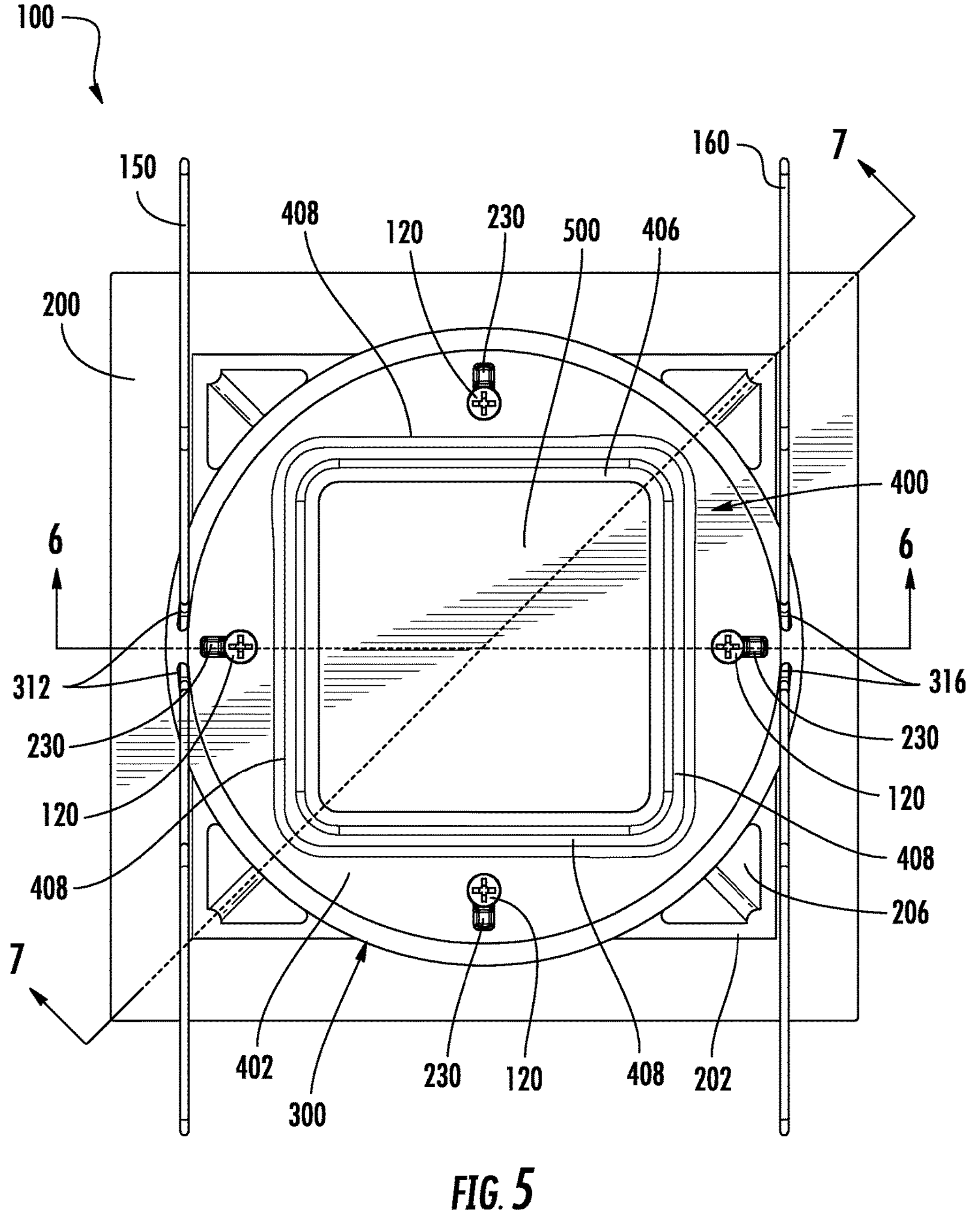
FIG. 5 illustrates a top view of the adjustable trim assembly of FIG. 1.

As illustrated in FIGS. 1, 3, and 5, the retention plate 400 may have a retention plate top surface 402 and a retention plate bottom surface 404 opposite the retention plate top surface 402. The retention plate 400 may also include a shelf 406 that is offset from the top surface 402. The retention plate 400 may also include a plurality of side surfaces 408 that extend from the retention plate top surface 402 to the shelf 406. The side surfaces 408 may form a truncated pyramidal shape with rounded corners connecting the respective side surfaces 408. The retention plate 400 may also include a central opening 416 that extends through the shelf 406.

The retention plate 400 may also include a plurality of elongated openings 420 extending through the retention plate top surface 402 and retention plate bottom surface 404. The elongated openings 420 may be aligned such that elongated openings 420 are evenly spaced with each other along the retention plate 400. For example, the elongated openings 420 may be positioned 90 degrees apart as shown in the exemplary embodiments of FIGS. 1, 3, and 5. Each of the plurality of elongated openings 420 may be sized, shaped, and located to align over a respective alignment boss 230 and corresponding hole 280 on the aperture trim 200. Each alignment boss 230 of the aperture trim 200 may extend through a respective elongated opening 420 to align and position the retention plate 400 onto the aperture trim 200. A securing member 120 may extend through each elongated opening 420 and each corresponding hole 280 to secure the retention plate 400 to the aperture trim 200 thereby securing the rotation ring 300 between the aperture trim 200 and the retention plate 400. The number of elongated openings 420 may equal the number of receiving members 214 located on the aperture trim 200, as such having as few as two elongated openings 420. Alternatively, the elongated openings 420 may be circular openings.

Figure 6:
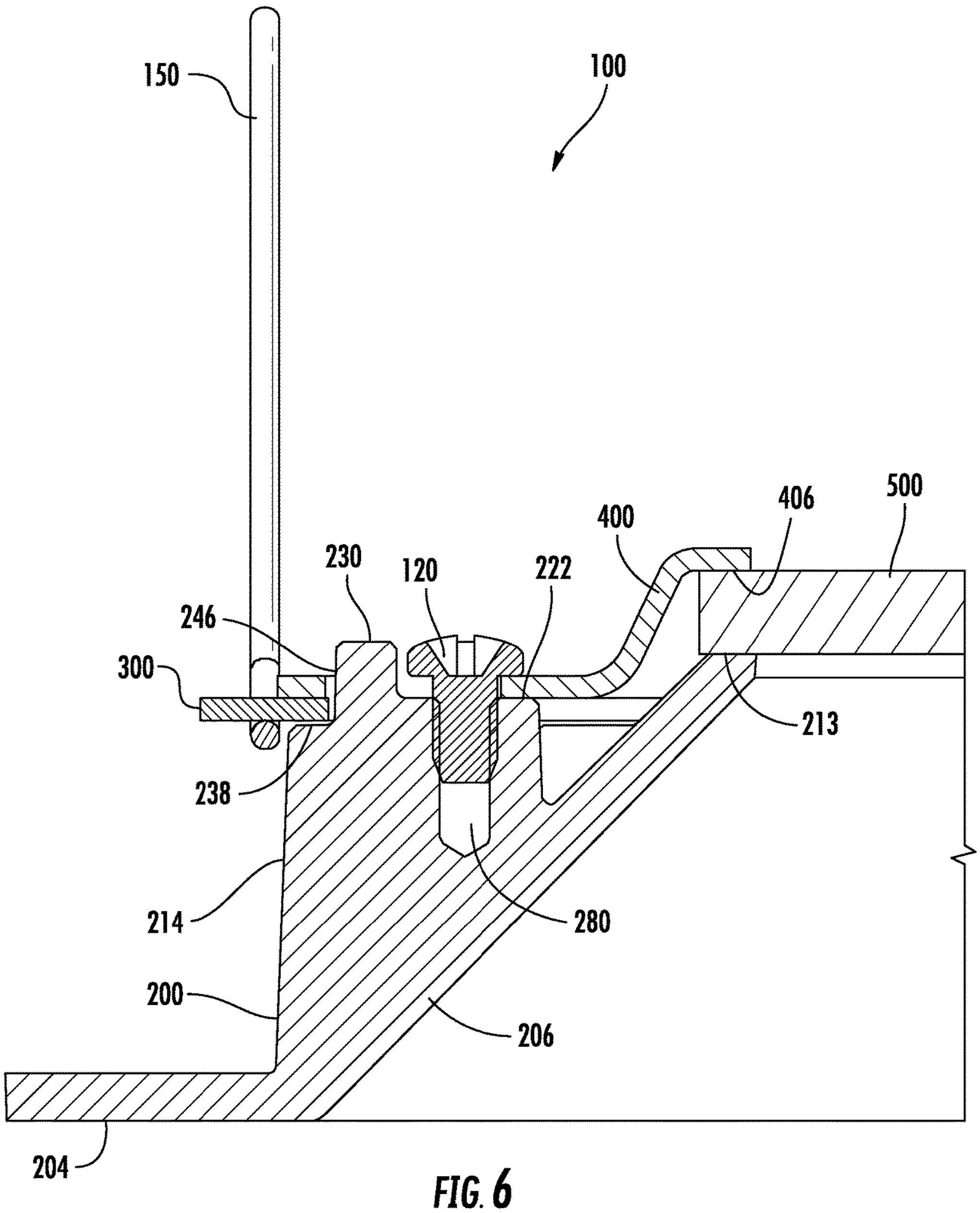
FIG. 6 illustrates a magnified cross-section view of the adjustable trim assembly of FIG. 5 along the line 6-6.

FIG. 5 shows a top view of the adjustable trim assembly 100 to show the square exterior shape of the aperture trim 200. FIG. 6 illustrates a cross-section view (along line 6-6) taken across the center line of the adjustable trim assembly 100 and shows the rotatable ring 300 in communication with the ring supporting surfaces 238 along with the alignment bosses 230 extending through the elongated openings of the retention plate 400. FIG. 6 also shows a lens 500 positioned between the shelf 406 of the retention plate 400 and the top surface 213 of the aperture trim 200 that may be formed by the surfaces opposite the support walls 206. A lens 500 may or may not be utilized with the adjustable trim assembly 100 in accordance with embodiments of this invention.

Figure 7:
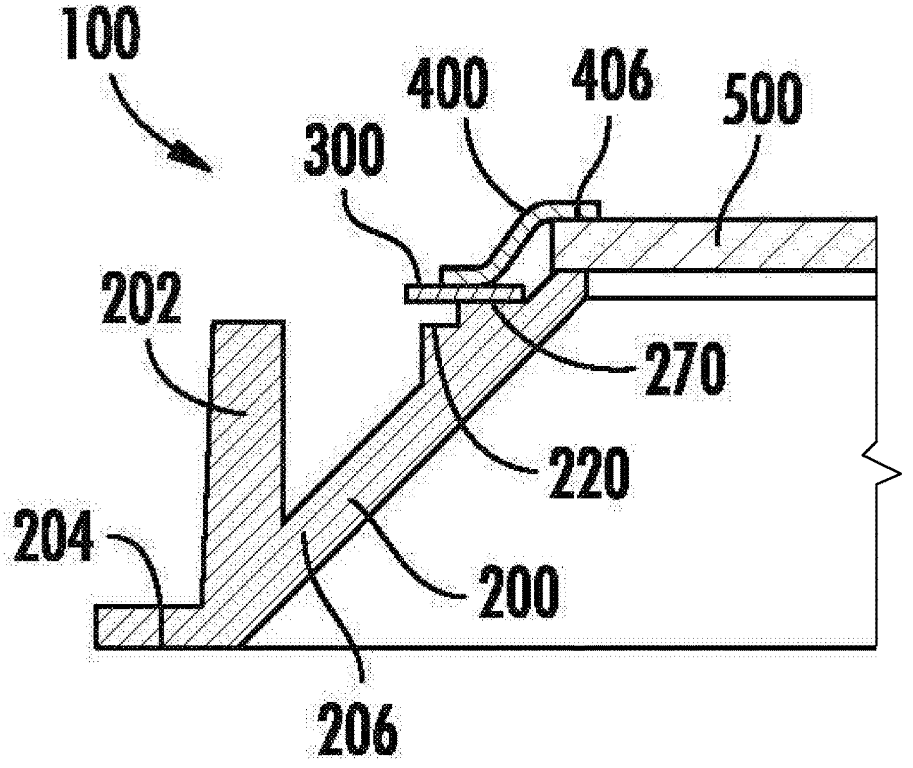
FIG. 7 illustrates a magnified cross-section view of the adjustable trim assembly of FIG. 5 along the line 7-7.

FIG. 7 illustrates a cross-section view (along line 7-7) taken across the diagonal of the adjustable trim assembly 100. As shown in FIG. 7, the rotatable ring 300 may be in communication/contact with the engaging surfaces 270 of the support bosses 260. Additionally, the spring supporting surface 220 is parallel to but offset from the engaging surfaces 270.

Figure 8:
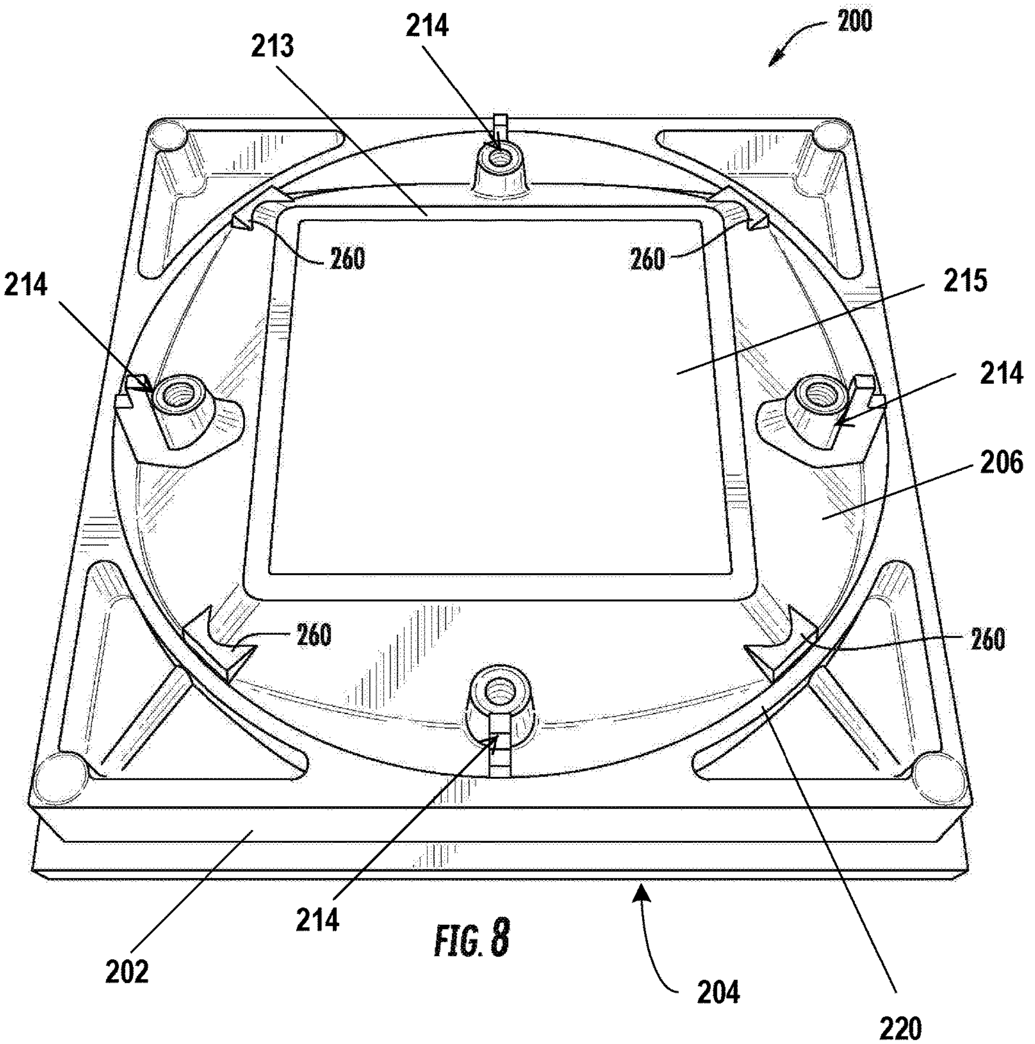
FIG. 8 illustrates a view of an alternate embodiment of the example adjustable trim assembly of FIG. 1 with an alternate aperture trim.
Figure 9A:
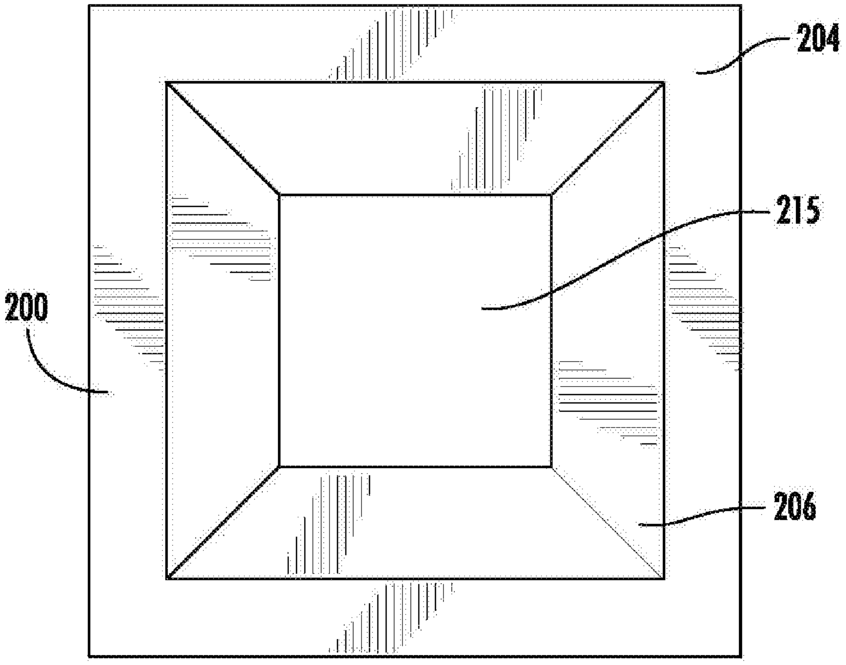
FIG. 9A illustrates a bottom view of the aperture trim of the adjustable trim assembly of FIG. 1.
Figure 9B:
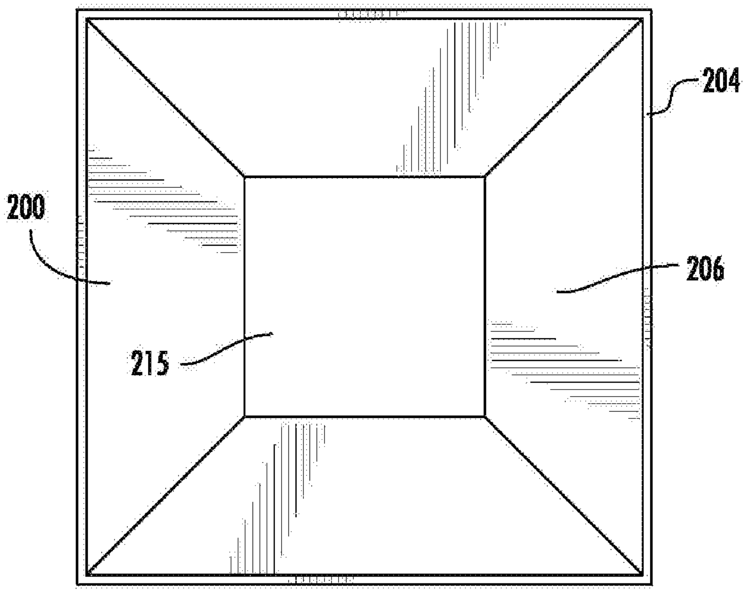
FIG. 9B illustrates a bottom view of the aperture trim of the alternate embodiment of adjustable trim assembly of FIG. 8.

Aspects of this invention may also include different types of aperture trims 200 without departing from this invention as shown in FIG. 8 of an alternate aperture trim panel with a smaller flange surface 204 or no flange surface. For example, the aperture trim 200 may be a circular aperture trim 200, or other shapes. Additionally, the aperture trim 200 may be of a wall-wash configuration without departing from this invention. FIGS. 9A and 9B illustrated alternative configurations of the aperture trim 200 in accordance with aspects of this invention.

Figure 10:
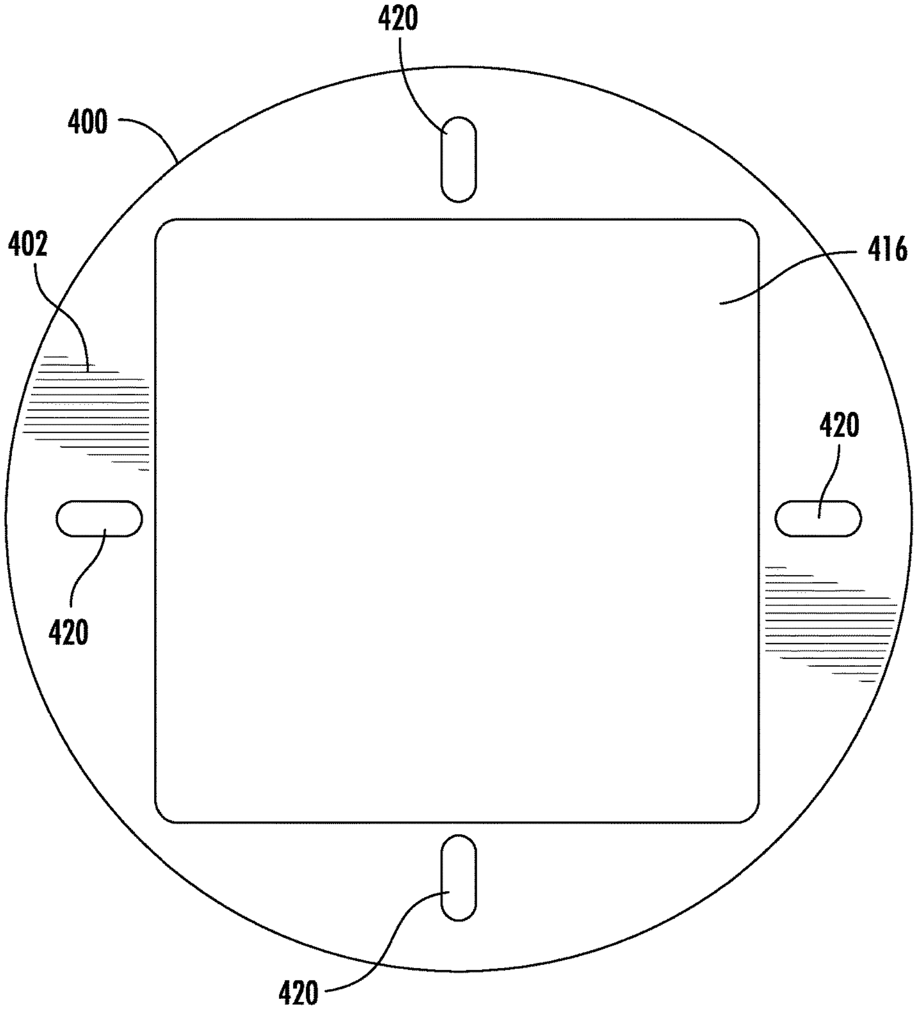
FIG. 10 illustrates a view of an alternate embodiment of a retention plate of the adjustable trim assembly of FIG. 1.

FIG. 10 illustrates an alternate retention plate 400, where the retention plate 400 is planar on both sides but includes the central opening 416 along with the elongated openings 420 as described above.

The aperture trim 200, the rotatable ring 300, and the retention plate 400 may all be formed using conventional processes such as casting, extruding, machining, or molding individually or in combination. The components may be formed of metallic materials such as an aluminum, aluminum alloy, steel, steel alloy, magnesium. Alternatively, the components may be formed of a nonmetallic material such as an unfilled polymer or filled polymer such as a carbon fiber or glass fiber reinforced polymer.

CONCLUSION

While the invention has been described in detail in terms of specific examples including presently preferred modes of carrying out the invention, those skilled in the art will appreciate that there are numerous variations and permutations of the above described systems and methods. Thus, the spirit and scope of the invention should be construed broadly as set forth in the appended claims.

I claim:

1. An adjustable trim assembly for a recessed lighting fixture comprising:

an aperture trim comprising a top surface defined along a perimeter of an aperture trim opening extending through the aperture trim, further comprising one or more receiving members, wherein each receiving member is configured to receive a securing member;

a ring comprising a circular exterior shape with a circular interior opening, the ring further comprising a first pair of elongated slots and a second pair of elongated slots that are configured to receive a first tension spring and a second tension spring; and a retention plate securing the ring on the aperture trim, the retention plate having a central opening extending through the retention plate, and a plurality of elongated openings extending through the retention plate, wherein the ring freely rotates around a center of the aperture trim opening, and further wherein the retention plate is secured to the aperture trim using a plurality of securing members.

2. The adjustable trim assembly of claim 1, wherein the aperture trim comprises a flange surface and a plurality of support walls that extend from the flange surface toward the top surface, and wherein the plurality of receiving members are located on the plurality of support walls.

3. The adjustable trim assembly of claim 2, wherein each receiving member further comprises a boss extending generally perpendicular to the flange surface and wherein each boss engages one of the plurality of elongated openings of the retention plate.

4. The adjustable trim assembly of claim 2, wherein the aperture trim further comprises a circular spring supporting surface that is substantially parallel to the flange surface and offset from a ring supporting surface on each of the plurality of receiving members.

5. The adjustable trim assembly of claim 1, wherein the plurality of receiving members comprises four receiving members oriented approximately 90 degrees apart from each other.

6. The adjustable trim assembly of claim 2, wherein the aperture trim further comprises a plurality of support bosses connected to the support walls, wherein each support boss has an engaging surface coplanar with a ring supporting surface on each receiving member.

7. The adjustable trim assembly of claim 6, wherein at least one of the engaging surfaces of the plurality of support bosses contacts the ring when the ring rotates between the aperture trim and the retention plate.

8. The adjustable trim assembly of claim 6, wherein at least one of the ring supporting surfaces on each receiving member contacts the ring when the ring rotates between the aperture trim and the retention plate.

9. The adjustable trim assembly of claim 1, further including a first tension spring having a substantially V-shaped portion extending through the first pair of elongated slots of the ring; and a second tension spring having a substantially V-shaped portion extending through the second pair of elongated slots of the ring.

10. An adjustable trim assembly for a recessed lighting fixture comprising:

an aperture trim comprising a flange surface and a plurality of support walls that extend from the flange surface toward a top surface defined along a perimeter of an aperture trim opening extending through the aperture trim, wherein each of the plurality of support walls comprise a receiving member having a ring supporting surface that is substantially parallel to the flange surface of the aperture trim and wherein each receiving member is configured to receive a securing member;

a ring comprising a circular exterior shape and a circular interior opening defining an interior surface, the ring including a first pair of elongated slots and a second pair of elongated slots, wherein the first pair of elongated slots are positioned on an opposite side of a centerline such that the second pair of elongated slots are mirrored from the first pair of elongated slots and the first pair of elongated slots and the second pair of elongated slots are configured to receive a first tension spring and a second tension spring; and a retention plate securing the ring on the aperture trim, the retention plate having a plurality of elongated openings extending through the retention plate, wherein the retention plate is secured to the aperture trim using a plurality of securing members, wherein each receiving member further comprises an alignment boss extending generally perpendicular to the flange surface and wherein each alignment boss engages one of the elongated openings of the retention plate and a ring supporting surface, wherein the ring freely rotates around a center of the aperture trim opening, and wherein at least one of the ring supporting surfaces contacts the ring when the ring rotates between the aperture trim and the retention plate.

11. The adjustable trim assembly of claim 10, wherein the plurality of receiving members comprises four receiving members oriented approximately 90 degrees apart from each other.

12. The adjustable trim assembly of claim 10, further including a first tension spring having a substantially V-shaped portion extending through the first pair of elongated slots of the ring; and a second tension spring having a substantially V-shaped portion extending through the second pair of elongated slots of the ring.

13. The adjustable trim assembly of claim 10, wherein each of the plurality of receiving members comprise a ring supporting surface that is parallel to the flange surface and engages the ring.

14. The adjustable trim assembly of claim 10, wherein at least one alignment boss is in communication with the interior surface of the ring.

15. The adjustable trim assembly of claim 10, wherein the aperture trim further comprises a circular spring supporting surface that is substantially parallel to the flange surface and offset from a ring supporting surface on each of the plurality of receiving members.

16. A recessed light fixture comprising:

an adjustable trim assembly connecting to a plaster frame of the recessed light fixture including a first tension spring and a second tension spring that engages an adjustable assembly of the recessed light fixture;

a light source engaged with the adjustable assembly;

wherein the adjustable trim assembly includes:

an aperture trim comprising a top surface defined along a perimeter of an aperture trim opening extending through the aperture trim, further comprising one or more receiving members, wherein each receiving member is configured to receive a securing member;

a ring comprising a circular exterior shape with a circular interior opening, the ring further comprising a first pair of elongated slots and a second pair of elongated slots that are configured to receive a first tension spring and a second tension spring; and a retention plate securing the ring on the aperture trim, the retention plate having a central opening extending through the retention plate, and a plurality of elongated openings extending through the retention plate, wherein the ring freely rotates around a center of the aperture trim opening, and further wherein the retention plate is secured to the aperture trim using a plurality of securing members, wherein when the ring rotates the aperture trim remains fixed.

17. The adjustable trim assembly of claim 16, wherein the aperture trim comprises a flange surface and a plurality of support walls that extend from the flange surface toward the top surface, and wherein the plurality of receiving members are located on the plurality of support walls.

18. The recessed light fixture of claim 17, wherein each receiving member further comprises an alignment boss extending generally perpendicular to the flange surface and wherein each alignment boss engages one of the elongated openings of the retention plate.

19. The recessed light fixture of claim 18, wherein at least one alignment boss is in communication with an interior surface of the ring.

20. The adjustable trim assembly of claim 17, wherein the aperture trim further comprises a circular spring supporting surface that is substantially parallel to the flange surface and offset from a ring supporting surface on each of the plurality of receiving members.

* * * * *